United States Patent
Hayashi et al.

(10) Patent No.: US 6,304,525 B1
(45) Date of Patent: Oct. 16, 2001

(54) DISC INVERTING MECHANISM AND DISC AUTOMATIC CHANGER WITH THE MECHANISM

(75) Inventors: Akio Hayashi, Kanagawa; Koutaro Onso, Tokyo; Hitoshi Nakamura, Ibaraki; Kouichi Shibasaki; Noritada Kuwayama, both of Tokyo, all of (JP)

(73) Assignee: Asaca Corporation, Tokyo (JP)

( * ) Notice: Subject to any disclaimer, the term of this patent is extended or adjusted under 35 U.S.C. 154(b) by 0 days.

(21) Appl. No.: 09/380,217
(22) PCT Filed: Dec. 29, 1998
(86) PCT No.: PCT/JP98/05989
  § 371 Date: Aug. 27, 1999
  § 102(e) Date: Aug. 27, 1999
(87) PCT Pub. No.: WO99/34364
  PCT Pub. Date: Jul. 8, 1999

(30) Foreign Application Priority Data

Dec. 29, 1997 (JP) .................................................. 9-369404
Jul. 30, 1998 (JP) .................................................. 10-214982
Nov. 30, 1998 (JP) .................................................. 10-338627

(51) Int. Cl.[7] .................................................. G11B 17/22
(52) U.S. Cl. .................................................. 369/36
(58) Field of Search .................................................. 369/36, 30, 77.2, 369/75.1, 75.2, 178; 360/98.01, 98.04, 98.06

(56) References Cited

U.S. PATENT DOCUMENTS 4,879,615 * 11/1989 Teranishi et al. .................... 369/244
5,220,548 * 6/1993 Nakatsukasa et al. ................. 369/36

FOREIGN PATENT DOCUMENTS

| 0717405 A2 | * 6/1996 | (EP) . |
| 60194744 | 12/1985 | (JP) . |
| 1-253866 | 10/1989 | (JP) . |
| 2-7264 | 1/1990 | (JP) . |
| 5-325385 | 12/1993 | (JP) . |
| 6-180920 | 6/1994 | (JP) . |
| 8-249782 | 9/1996 | (JP) . |

* cited by examiner

*Primary Examiner*—Craig A. Renner
*Assistant Examiner*—Julie Anne Watko
(74) *Attorney, Agent, or Firm*—Varndell & Varndell, PLLC

(57) ABSTRACT

A rotating frame 22 is supported by a stationary frame 21 rotatably by 180 degrees, and in both side plates 22c of the rotating frame 22, there are formed four pairs of guide grooves 25–28 for guiding pallets 9 and slots 32a–32d for moving claw members 30, 31, said slots corresponding to said guide grooves 25–28. On an inner wall of a rear plate 22b of the rotating frame 22, there is provided an up and down movable member 47 which moves downward together with the claw members 30, 31 when the rotating frame 22 is rotated by 180 degrees. Into the first and third guide grooves 25 and 27, there have been previously inserted empty pallets 9 with such a posture that their front surfaces 11 face downward. By moving the claw members 30, 31 along the slots 32b, 32d, the pallets 9 having discs D placed thereon are drawn into the second and fourth guide grooves 26 and 28 such that these pallets 9 are opposed to the upper empty pallets 9. In this condition, when the rotating frame 22 is rotated by 180 degrees, the discs D are turned-over and are placed on the lower empty pallets 9.

18 Claims, 10 Drawing Sheets

DISC INVERTING MECHANISM AND DISC AUTOMATIC CHANGER WITH THE MECHANISM

TECHNICAL FIELD

The present invention relates to a disc turn-over mechanism for turning-over discs such as CD and DVD, and an automatic disc exchange apparatus comprising said mechanism for use in a storing device of a computer and others and a recording and reproducing device of AV equipments.

TECHNICAL BACKGROUND

Heretofore, discs such as FD and MO are installed within cases to constitute cartridges, and in an automatic disc exchange apparatus, the exchange of discs is performed by exchanging cases between a storing means and a recording and reproducing apparatus. Therefore, when both front and rear surfaces of a disc are used as the recording surface, in the automatic disc exchange apparatus, the disc turn-over can be carried out by turning-over a case upside down.

Recently there have been developed discs such as CD and DVD which are not installed within cases. In the automatic disc exchange apparatus, such a disc is placed on a tray-like pallet and the pallet is transported between the disc storing means and the recording and reproducing apparatus. Therefore, when both front and rear surfaces of such a disc are usable, it is necessary to turn-over the disc placed on the pallet in the automatic disc exchange apparatus. However, if the pallet having a disc placed thereon is turned-over, the disc is dropped off the pallet.

It is an object of the present invention to provide a disc turn-over mechanism, which overcomes the above mentioned problem and can turn-over a disc whose front and rear surfaces are usable as the recording surface.

It is another object of the invention to provide an automatic disc exchange apparatus, in which a disc can be turned-over during a transportation between a disc storing means and a recording and reproducing apparatus.

DISCLOSURE OF THE INVENTION

According to the invention, a disc turn-over mechanism comprises at least one pair of first and second pallets, and a turning-over means for turning-over said first and second pallets, wherein said first pallet on which a disc is placed and said second pallet on which no disc is placed are stacked one on the other, and the turned-over disc is transferred onto the second pallet by turning-over the first and second pallets by said turning-over means.

According to the invention, an automatic disc exchange apparatus comprises a storing means for storing discs, a recording and reproducing apparatus for recording and reproducing information on and from said discs, a transporting means for transporting said discs between said storing means and said recording and reproducing apparatus, and a turn-over mechanism for turning-over the discs, wherein said turn-over mechanism includes at least one pair of first and second pallets and a turning-over means for turning-over said first and second pallets, said first pallet on which a disc is placed and said second pallet on which no disc is placed are stacked one on the other, and said disc is turned-over and the turned-over disc is transferred onto the second pallet by turning-over the first and second pallets by said turning-over means.

BEST MODE OF PRACTICING THE INVENTION

Now the present invention will be explained in detail with reference to the accompanying drawings.

Figure 1:
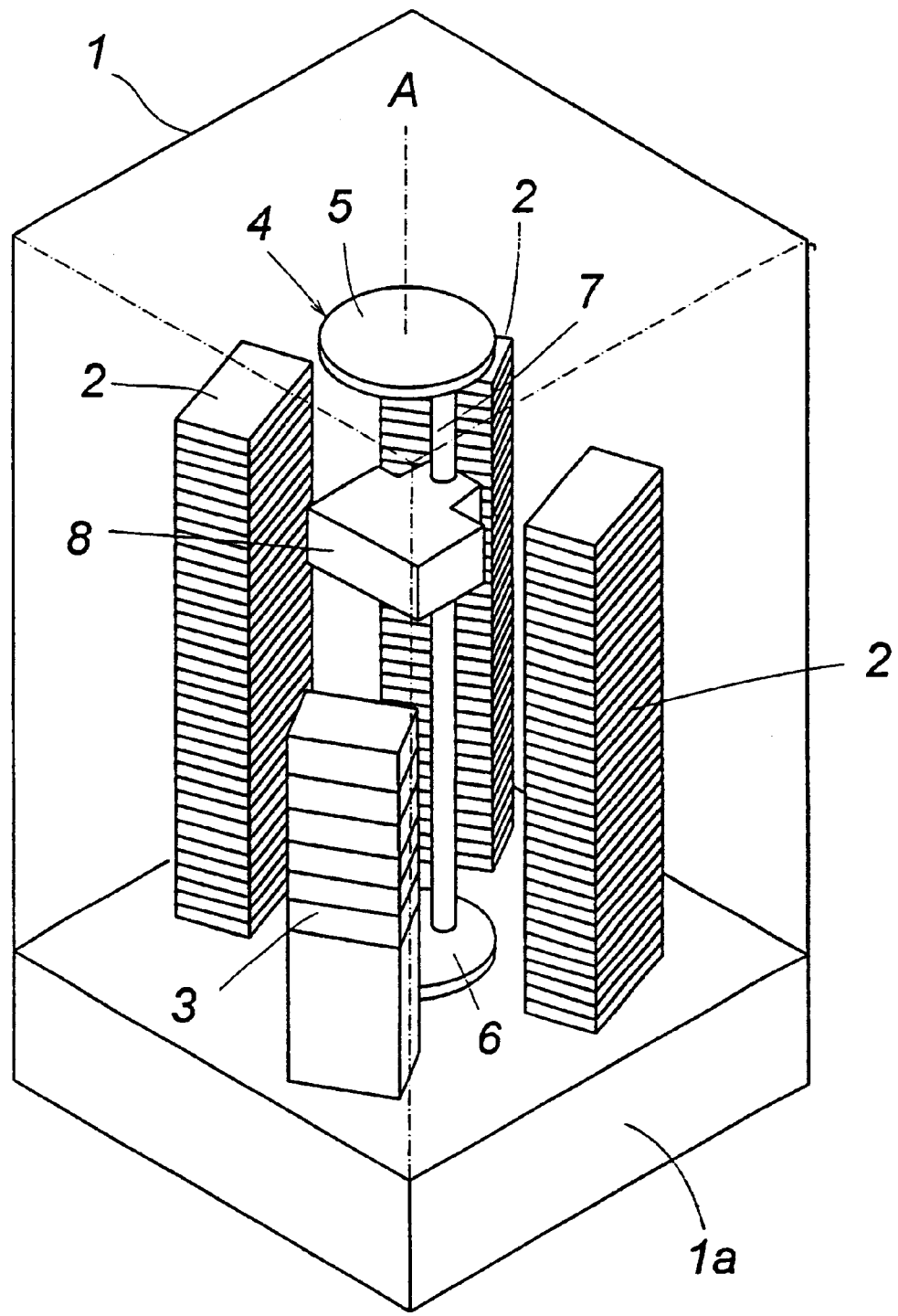
FIG. 1 is a perspective view showing a first embodiment.

FIG. 1 is a perspective view showing a first embodiment, in which a part of a housing 1 is denoted by an imaginary line. On a base platform 1a provided at a bottom of the housing 1, there are arranged, on a same circle, storing boxes 2 in each of which a number of information record medium, i.e. discs such as CD and DVD installed within thin flat plate-like pallets are stored, and a recording and reproducing drive 3 for recording and reproducing information on and from the discs. Within a space surrounded by these storing boxes 2 and recording and reproducing drive 3, there is arranged a transporting mechanism 4 for transporting pallets having discs placed thereon between the storing boxes 2 and the recording and reproducing drive 3. In the present embodiment, three sets of arrays of the storing box 2 are arranged on the same circle and one set of array of the recording and reproducing drives 3 is arranged on the same circle.

The transporting mechanism 4 includes upper and lower discs 5 and 6 which are arranged rotatably about a center line A of the circle along which the storing boxes 2 and recording and reproducing driver portion 3 are arranged. To these discs 5, 6 is secured a post 7 at an eccentric position, and a turn-over and hand-over mechanism 8 for handing-over a pallet having a disc placed thereon between the storing boxes 2 and the recording and reproducing drives 3 and for turning-over a received disc together with the pallet is supported by the post 7. The turn-over and hand-over mechanism 8 is movable up and down along the post 7 and is rotatable about a center line A together with the post 7. There are provided driving mechanisms for rotating the discs 5, 6 and moving the turn-over and hand-over mechanism 8 up and down such that the turn-over and hand-over mechanism can be indexed at a desired storing box 2 as well as a desired recording and reproducing drive 3, but these mechanism are not shown in the drawing.

Figure 2:
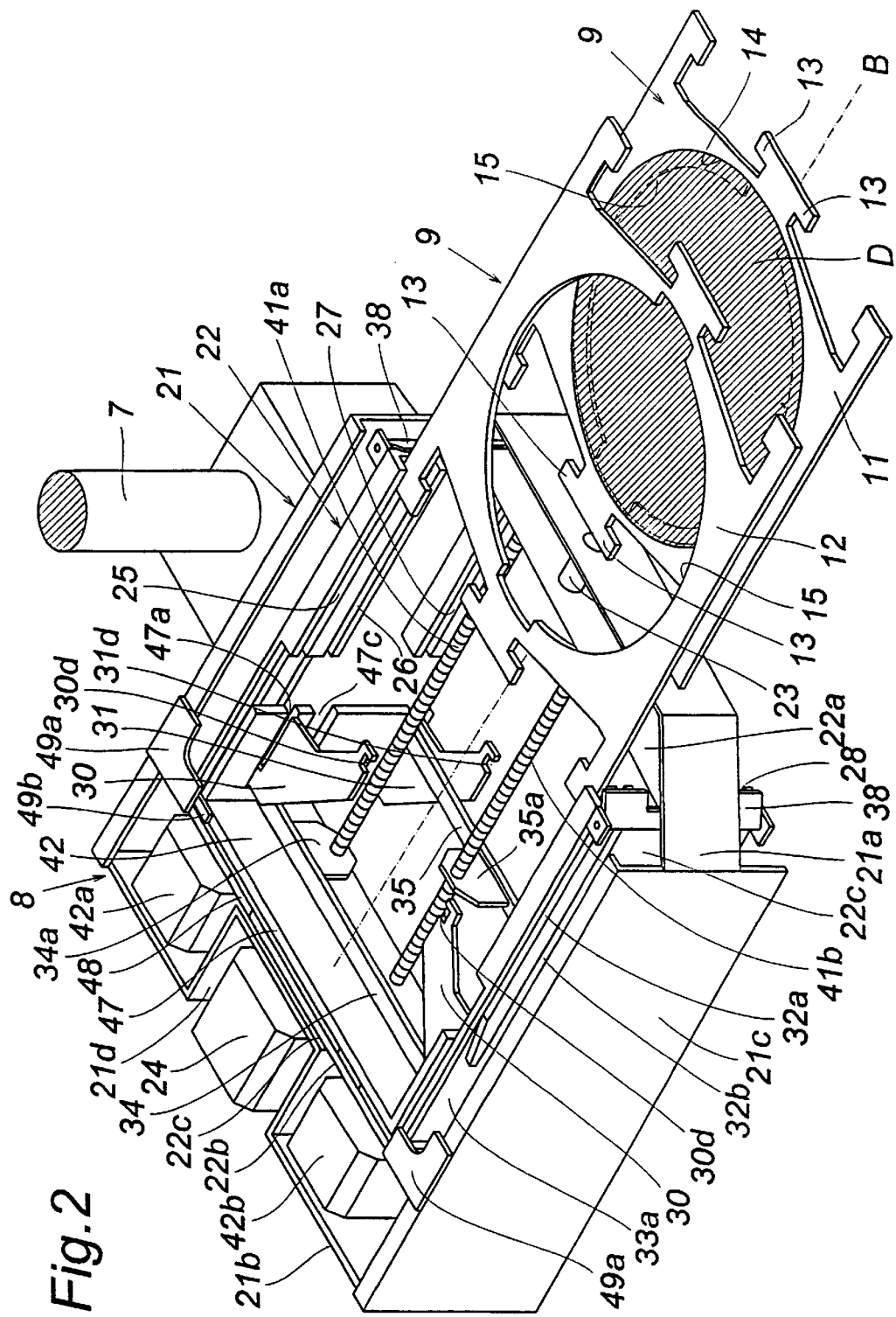
FIG. 2 is a perspective view illustrating a turn-over and hand-over mechanism together with a pair of pallets.

FIG. 2 is a perspective view showing the turn-over and hand-over mechanism 8 together with a set of pallets 9. The present turn-over and hand-over mechanism 8 can contain two sets of pallets 9. That is to say, two empty pallets 9 which do not contain a disc D are installed within the turn-over and hand-over mechanism 8 with interposing a spacing therebetween, and further two pallets 9 each containing a disc D may be inserted into spaces formed underneath the previously installed pallets 9.

These four pallets 9 may be retained within the turn-over and hand-over mechanism 8 or may be discharged from the turn-over and hand-over mechanism 8 by means of two pairs of claw members which will be explained later. Within the turn-over and hand-over mechanism 8, adjacent pallets 9 are stacked to be opposed to each other, and the stacked pallets 9 are turned-over by 180 degrees, while the disc D is prevented from dropping off the pallets.

Now it is assumed that a direction in which the pallets 9 are inserted into the turn-over and hand-over mechanism 8 is denoted as a forward direction. Then, the pallet 9 is formed symmetrical in the forward and backward directions as well as in the right and left directions. The pallet 9 comprises a front surface 11 on which a disc D is placed, a rear surface 12 opposite to the front surface, and a pair of projections 13 which are gripped by claw members as will be explained later.

In the front surface 11 of the pallet 9 there is formed a circular depressed portion 14 for containing the disc D, and the circular depressed portion 14 has a circular window 15 whose diameter is smaller than that of the disc D. At a corner of the circular depressed portion 14 there is formed a step not shown, and the circular depressed portion 14 has a diameter which is sufficient for containing the disc D therein and a diameter of the step is such that the record surface of the disc D is not brought into contact with the pallet even if the disc deviates within the circular depressed portion 14.

Therefore, the two pallets 9 which have been previously installed in the turn-over and hand-over mechanism 8 have the rear surfaces facing downward, and the pallets 9 containing the disc D are installed below the previously installed pallets 9 such that their front surfaces 11 are opposed to each other.

The turn-over and hand-over mechanism 8 comprises a stationary frame 21 provided on the post 7 in such a manner that the stationary frame 21 is movable up and down, and within the stationary frame 21 there is arranged a rotating frame 22 such that the rotating frame is rotatable about an axis B. When it is assumed that a direction into which the turn-over and hand-over mechanism 8 hands-over the pallet 9 is a forward direction, the stationary frame 21 and rotating frame 22 are formed to be symmetrical in the right and left fashion as well as in the up and down fashion except for parts of these frames. However, since the rotating frame 22 is provided with an up and down moving mechanism to be explained later, members and parts which are symmetrical in the right and left fashion are denoted by the same reference numerals, but members and parts which are symmetrical in the up and down fashion are represented by different reference numerals.

Figure 3:
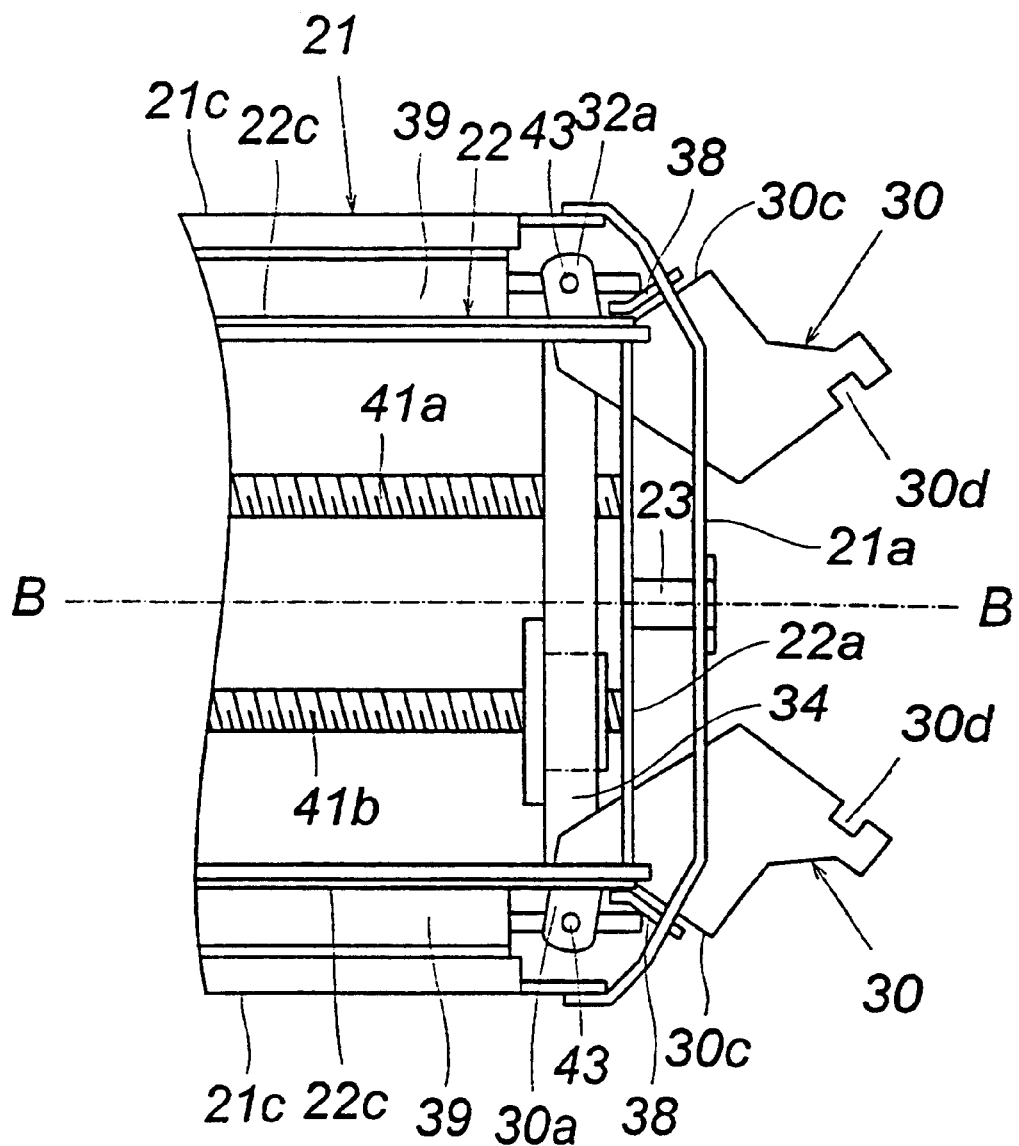
FIG. 3 is a partially enlarged plan view of the turn-over and hand-over mechanism.

FIG. 3 is a plan view showing a part of the turn-over and hand-over mechanism 8 on an enlarged scale. A center of a front plate 21a of the stationary frame 21 and a center of a front plate 22a of the rotating frame 22 are connected with each other in a rotatable manner by means of a shaft 23, and similarly a center of a rear plate 21b of the stationary frame 21 and a center of a rear plate 22b of the rotating frame 22 are connected with each other by means of a shaft not shown in such a manner that the rear plate 22b of the rotating frame 22 is rotated with respect to the rear plate 21b of the stationary frame 21. A spacing between a side plate 21c of the stationary frame 21 and a side plate 22c of the rotating frame 22 is set to such a value that these side plates 21c and 22c are not brought into contact with each other during the rotation of the rotating frame 22. As illustrated in FIG. 2, a driving motor 24 for rotating the rotating frame 22 is provided at a depression 21d formed at a center of the rear plate 21b of the stationary frame 21, and the rotating frame 22 is rotated by means of the driving motor 24 in positive and negative directions by 180 degrees.

Figure 4:
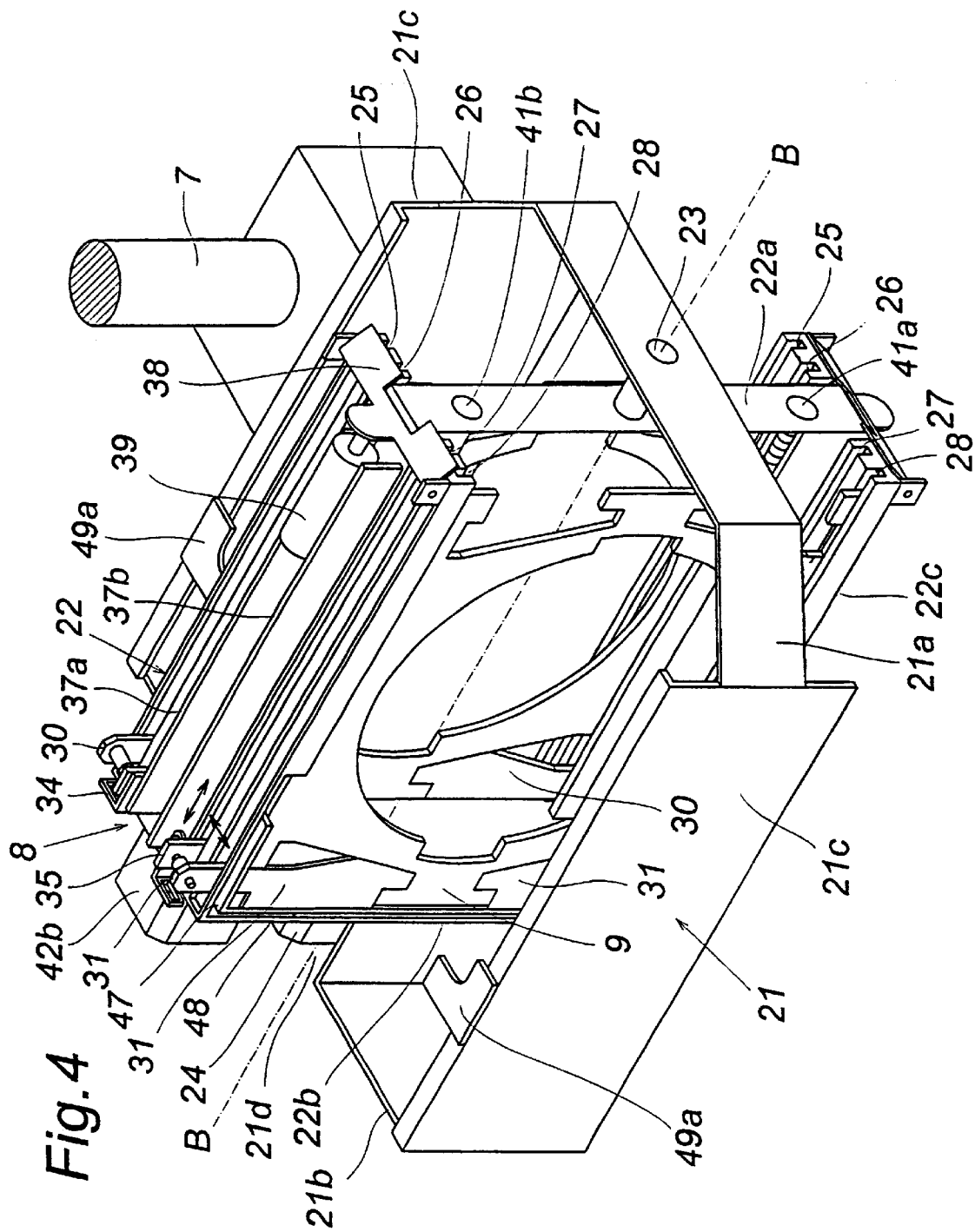
FIG. 4 is a perspective view showing the turn-over and hand-over mechanism in a condition in which a rotating frame is rotated by 90 degrees.

FIG. 4 is a perspective view depicting the turn-over and hand-over mechanism 8 under such a condition that the rotating frame 22 is rotated by 90 degrees in the right hand direction viewed in a direction from the front plate 22a to the rear plate 22b, and the pallets 9 have been inserted into the turn-over and hand-over mechanism 8. Also shown in FIG. 2, in each of inner surfaces of the side plates 22c of the rotating frame 22, there are formed first to fourth guide grooves 25–28 for guiding the pallets 9. A spacing between the first and second guide grooves 25 and 26 and a spacing between the third and fourth guide grooves 27 and 28 are set such that when a pair of pallets are opposed to each other without forming a space therebetween, the disc D installed in the pallets is not dropped off the pallets during the rotation of the rotating frame 22. The second guide groove 26 is separated from the third guide groove 27 by a spacing which is larger than a width of the front plate 21a of the stationary frame 21 as well as a width of the front plate 22a of the rotating frame 22, such that the pallets 9 situating in the horizontal plane may be easily inserted into the second and third guide grooves 26 and 27.

It should be noted that the empty pallets 9 having no disc installed therein have been previously inserted into the first and third guide grooves 25 and 27. Furthermore, in order to insert easily the pallets into the second and third guide grooves 26 and 27 in the horizontal posture, the front plates 21a and 22a have a small width. Alternatively, slots through which the pallets may be inserted may be formed in the front plates 21a, 22a.

Figure 5:
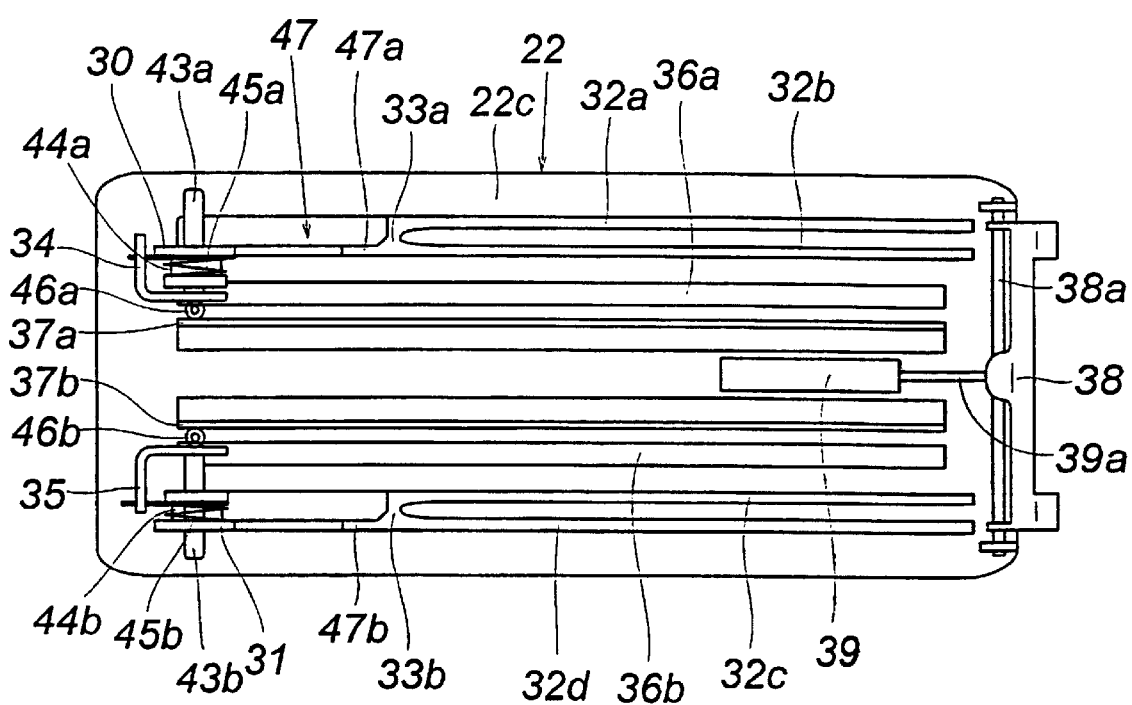
FIG. 5 is a side view representing the rotating frame.

FIG. 5 is a side view illustrating the rotating frame 22. In the side plate 22c of the rotating frame 22, there are formed first to fourth claw guide slots 32a–32d for guiding claw members 30 and 31 in the forward and backward directions such that these slots are communicated with the first to fourth guide grooves 25–28, respectively, said claw members gripping the pallet 9. These claw guiding slots 32a–32d have a width which is sufficiently small such that the pallet does not drop off through the slots. At a rear portion of the side plate 22c, there are formed claw exchange slots 33a and 33b which serve to guide the claw members 30, 31 to move into suitable claw guide slots 32a–32d, said respective claw switching slots being communicated with the claw guide slots 32a, 32b and 32c, 32d, respectively.

In the side plate 22c, there are formed slots 36a, 36b through which forward and backward movable members 34, 35 are moved, and rails 37a, 37b for supporting the forward and backward movable members 34, 35. On an outer surface of a front portion of the side plate 22c, a pushing member 38 for pushing the claw members 30, 31 to rotate inwardly is provided to be rotatable about a shaft 38a which is secured to the side plate 22c . In the vicinity of the pushing plate 38 provide on the outer surface of the side plate 22c, there is provided a solenoid 39 having a rod 39a for driving the pushing member 38.

In the manner explained above, on the rotating frame 22, there are provided the first to fourth guide grooves 25–28, claw members 30, 31, first to fourth claw guide slots 32a–32d, slots 33a, 33b, slots 36a, 36b, rails 37a, 37b, pushing member 38 and solenoid 39 in a right and left symmetrical manner.

Again as shown in FIG. 2, the forward and backward movable members 34, 35 are screwed to screw shafts 41a, 41b by means of connecting parts 34a, 35a such that the forward and backward movable members move forward and backward, said screw shafts being pivotally supported by the rotating frame 22. On the outer surface of the rear plate 22b of the rotating frame 22, there are provided driving motors 42a, 42b for rotating the screw shafts 41a, 41b, respectively.

Figure 6:
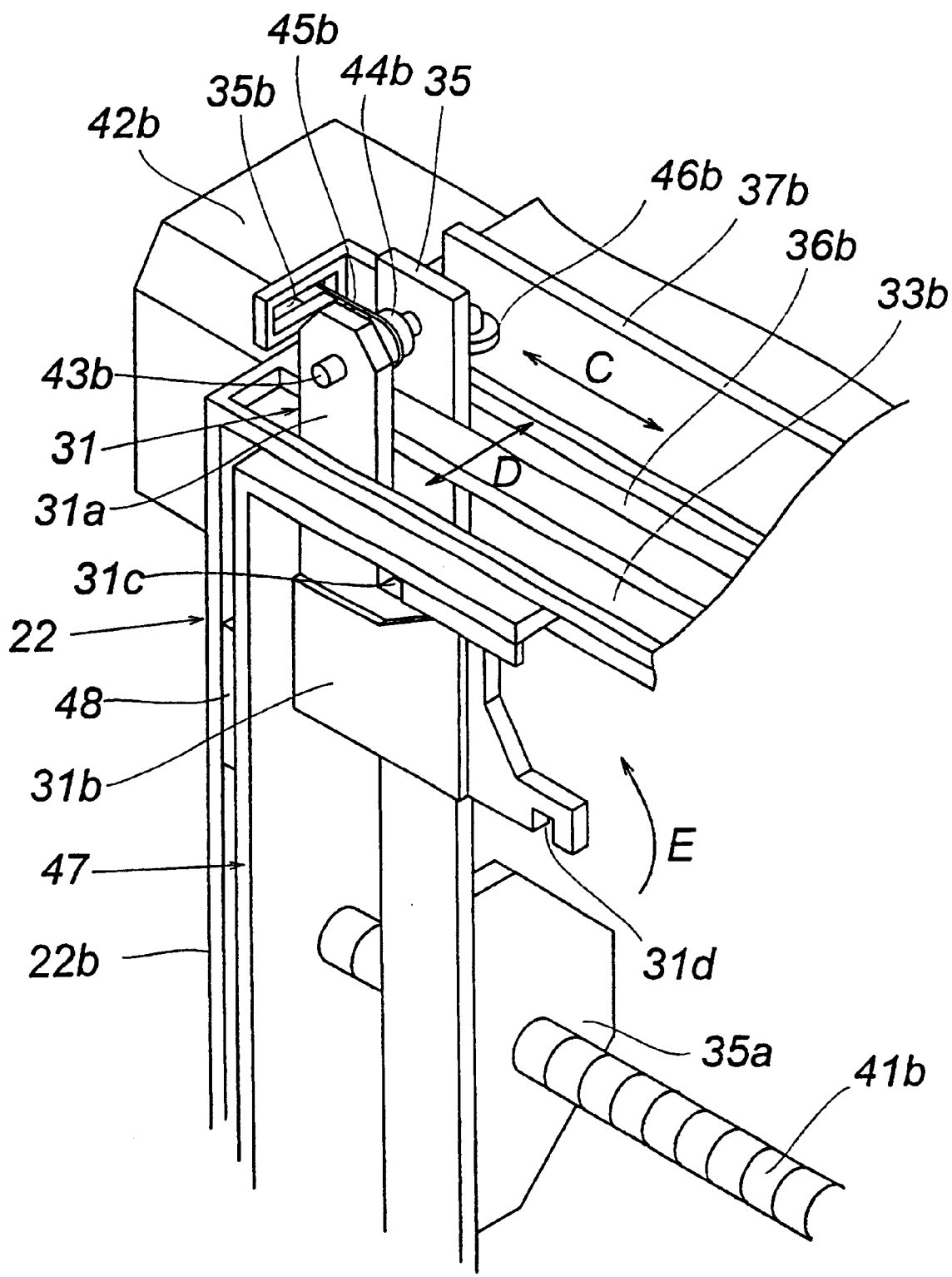
FIG. 6 is a partially enlarged perspective view of the rotating frame corresponding to FIG. 4.

FIG. 6 is a partially enlarged view corresponding to FIG. 4 showing the coupling mechanism between one of the claw members 31 and one of the forward and backward movable members 35, and the coupling mechanism between the other claw member 30 and the other forward and backward movable member 34 has a similar structure. The forward and backward movable members 34, 35 are movable in a direction C with respect to the rotating frame 22, and the claw members 30, 31 are supported by the forward and backward movable members 34, 35 by means of the supporting shafts 43a, 43b, said claw members being slidable in a direction D with respect to the forward and backward movable members 34, 35 and being rotatable in a direction E. On outer surfaces of bearing portions 44a, 44b provided integrally with the claw members 30, 31, there are arranged coiled springs 45a, 45b whose one ends are inserted into stopping holes 34b, 34d of the forward and backward movable members 34, 35 such that the claw members 30, 31 are energized in the direction E. On the inner surfaces of the forward and backward movable members 34, 35 there are provided rollers 46a, 46b which rotate on the rails 37a, 37b.

In this manner, on the rotating frame 22 there are arranged the shafts 43a, 43b, bearing portions 44a, 44b, coiled springs 45a, 45b and rollers 46a, 46 in the right and left symmetrical manner. It should be noted that the two forward and backward movable members 34, 35 are provided one on the other, and the two screw shafts 41a, 41b are arranged in the right and left symmetrical manner.

In front of the rear plate 22b of the rotating frame 22, there is arranged ⊐-shaped up and down movable member 47 which is coupled with the rear plate 22b by means of a guide member 48 and is movable in the direction D. In the up and down movable member 47, there are formed slots 47a, 47b through which base portions 30a, 31a of the claw members 30, 31 are passed, and wider slots 36a, 36b through which the forward and backward movable members 34, 35 are passed. When the claw members 30, 31 are inserted into slots 47a, 47b formed in the up and down movable member 47, thick portions 30b, 31b (thick portion 30b is not shown) are urged against the inner surface of the up and down movable member 47 such that their outward movements are restricted.

The up and down movable member 47 constructed in the manner explained above moves downward by the gravitational force when the rotating frame 22 is rotated, and one of the slots 47a is aligned with the second claw guide slot 32b and the other slot 47b is aligned with the fourth claw guide slot 32d. When the rotating frame 22 is rotated in the opposite direction, the up and down movable member 47 moves also downward by the gravitational force, and one of the slots 47a is aligned with the first claw guide slot 32b and the other slot 47b is aligned with the third claw guide slot 32d.

A pair of stoppers 49a are provided on rear portions of the respective side plates 21c of the stationary frame 21 and a pair of projections 49b are provided on upper and lower portions of one side of the up and down movable member 47 such that the stoppers 49a are brought into contact with the projections in the rotating directions. Then, when the rotating frame 22 is rotated in both directions, the up and down movable member 47 may be forcedly moved downward.

Figure 7:
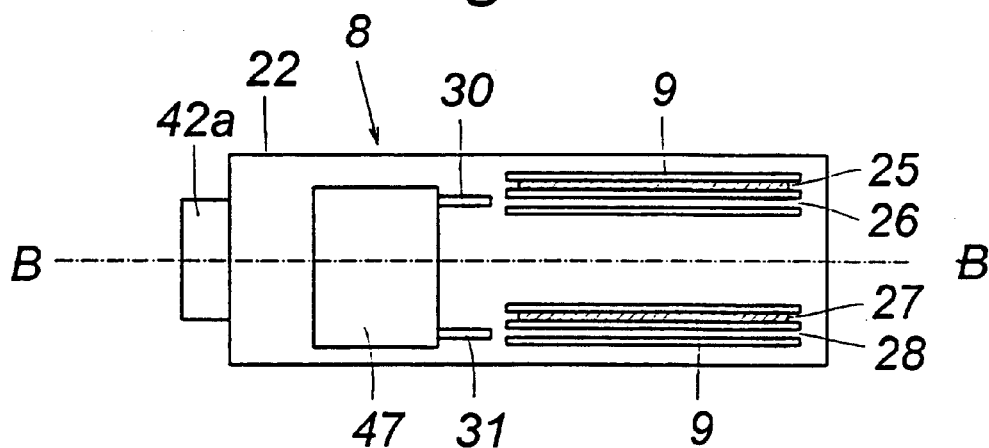
FIG. 7 is a view explaining the operation.

As shown in FIG. 7 illustrating a partially cross sectional view of the turn-over and hand-over mechanism 8 constructed in the manner mentioned above, at first, the empty pallets 9 are contained in the first guide groove 25 and third guide groove 27, respectively in such a posture that the surfaces 11 are faced with the second guide groove 26 and fourth guide groove 28, respectively. The up and down movable member 47 moves downward due to the gravitational force or the engagement of the stopper 49a with one of the projections 49b, and the claw members 30 and 31 are aligned with the second and fourth guide grooves 26 and 28, respectively.

Figure 8:
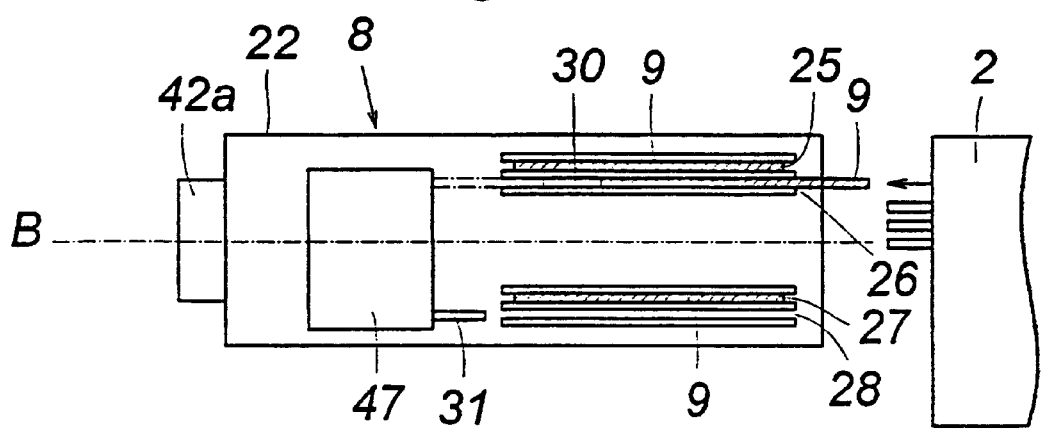
FIG. 8 is a view explaining the operation.

Next, a control circuit of the transporting mechanism 4 sends a command, and the turn-over and hand-over mechanism 8 is moved by the transporting mechanism 4 in front of a desired storing box 2 as depicted in FIG. 8. Then, one of the driving motors 42a of the turn-over and hand-over mechanism 8 rotates one of the screw shafts 41a and one of the forward and backward movable member 34 is moved forwardly. During this movement, the slide surface 30c of the claw member 30 slides along the side surface of the up and down movable member 47 as well as along the bottom wall of the second guide groove 26 and projects forwardly beyond the front plate 22a of the rotating frame 22.

Then, the slide surface 30c of the claw member 30 removes from the second guide groove 26, and the claw member 30 is rotated outwardly by the force of the coiled spring 45a. When the claw member 30 is moved forwardly into such a position that the engaging groove 30d of the claw member 30 can engage with the projection 13 of the pallet 9, the solenoid 39 is driven and the slide surface 30c of the claw member 30 is pushed by the rod 39a by means of the pushing member 38. Then, the projection 13 of the pallet 9 is engaged with the engaging groove 30d of the claw member 30 to grasp the pallet 9 by means of the claw member 30.

Figure 9:
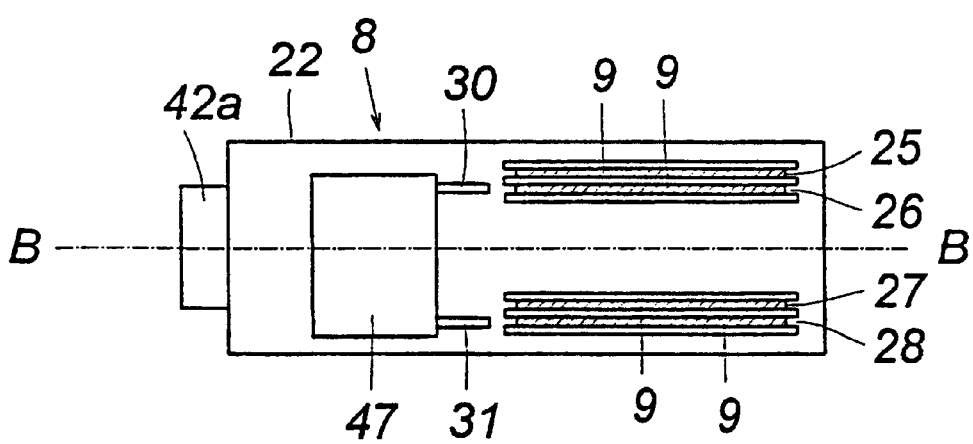
FIG. 9 is a view explaining the operation.

After that, the screw shaft 41a is rotated in the opposite direction by means of the driving motor 42a to draw the claw member into the second guide groove 26. At a time when the slide surface 30c of the claw member 30 can slide on the bottom wall of the second guide groove 26, the operation of the solenoid 39 is stopped and the pallet 9 having a desired disc D placed thereon is draw into the second guide groove 26 while the claw member 30 is retained on the bottom wall of the second guide groove 26. Then, the transporting mechanism 4 transports the turn-over and hand-over mechanism 8 in front of a desired storing box 2, and the other claw member 31 engages the pallet 9 having a desired disc D placed thereon like as the claw member 30 and the pallet 9 is drawn into the fourth guide groove 28. In this manner, as illustrated in FIG. 9, the four pallets 9 have been contained within the rotating frame 22.

Figure 10:
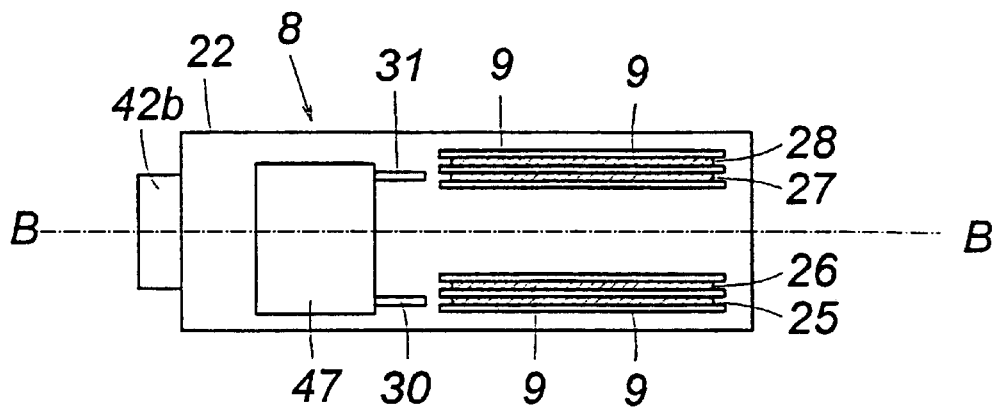
FIG. 10 is a view explaining the operation.

After installing the desired discs D from the storing boxes 2 into the turn-over and hand-over mechanism 8, the transporting mechanism 4 initiates to move the turn-over and hand-over mechanism 8 in front of the recording and reproducing drive 3. If it is required to turn-over the discs D, the driving motor 24 is operated to rotate the rotating frame 22 over 180 degrees. Since the empty pallets 9 have been contained within the first and third grooves 25 and 27, respectively, the discs D are dropped onto these empty pallets 9 and are turned-over, as shown in FIG. 10 when the rotating frame 22 is rotated.

Figure 11:
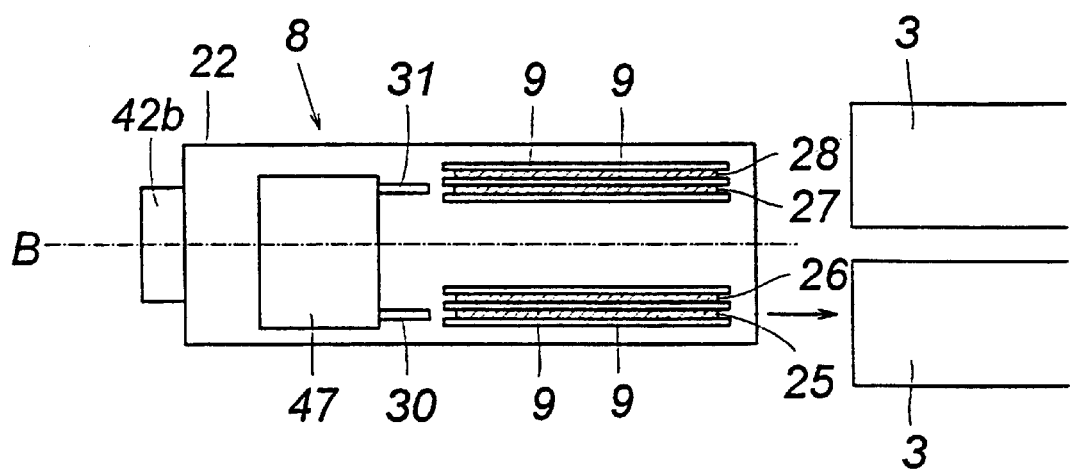
FIG. 11 is a view explaining the operation.

Upon the rotation of the rotating frame 22, the up and down movable member 47 is moved downward due to the gravitational force or the action of the stopper 49a and the other projection 49b, and the claw members 30 and 31 are shifted downward to align with the lower third and first guide members 27 and 25, respectively. As depicted in FIG. 11, after moving the turn-over and hand-over mechanism 8 in front of the recording and reproducing drive 3 by means of the transporting mechanism 4 as shown in FIG. 11, the claw members 30, 31 are driven simultaneously or successively to insert the pallets 9 supporting the turned-over discs D into the recording and reproducing drive 3.

During this operation, the solenoid 39 is driven and the claw members 30, 31 are extruded into the input opening of the recording and reproducing derive 3, while the engaging grooves 30d, 31d of the claw members 30, 31 are engaged with the projections 13 of the pallets 9, and the pallets 9 are inserted into the recording and reproducing drive 3. After that, the solenoid 39 is de-energized and the claw members 30, 31 are rotated outwardly by the force of the coiled springs 45a, 45b to relieve the engagement between the engaging grooves 30d, 31d of the claw members 30, 31 and the projections 13 of the pallets 9. After relieving the pallets 9, the claw members 30, 31 are drawn into the rotating frame 22.

In this manner, when the discs D are required to be turned-over, the discs are turned-over within the turn-over and hand-over mechanism 8 during the transportation to the recording and reproducing drive 3, but when it is not required to turn-over the discs D, the discs are inserted into the recording and reproducing drive 3 without being turned-over. By operating the turn-over and hand-over mechanism 8 in the opposite manner, the discs are taken out of the recording and reproducing drive and are returned into the storing boxes 2. In this case, the turned-over discs may be turned-over again by the turn-over and hand-over mechanism 8 or may be returned into the storing box without being turned-over. In the case of returning the disc without being turned-over, the memory of the control circuit should store this fact.

In this manner, in the first embodiment, the empty pallets 9 have been previously contained in the first and third guide grooves 25 and 27 in such a posture that these pallets face downward, and then the pallets 9 having the discs D placed thereon are inserted under the empty pallets 9 such that the disc is sandwiched between the pallets 9. Therefore, when the rotating frame 22 is rotated by 180 degrees to turn-over the pallets 9, the disc D do not drop off the pallets 9 and the turned-over discs D can be placed on the empty pallets 9.

Furthermore, by driving a pair of the claw members 30 and 31 upon exchanging a disc D installed in the recording and reproducing drive 3, a new disc D is transported into the recording and reproducing drive 3 by means of the one claw member 30 and the existing disc D installed in the recording and reproducing drive 3 can be drawn into the rotating frame 22. Therefore, a time required for transporting the existing disc D into the storing box 2 can be dispensed with, and the treating time can be shortened. Moreover, even if one of the claw members 30, 31 might be out of order, the operation can be performed by means of the other claw member to attain a fail safe faculty. When a shortening of the treating time and fail safe faculty are ignored, the turn-over and hand-over mechanism 8 may be constructed to include only a half of the hand-over mechanism.

Figure 12:
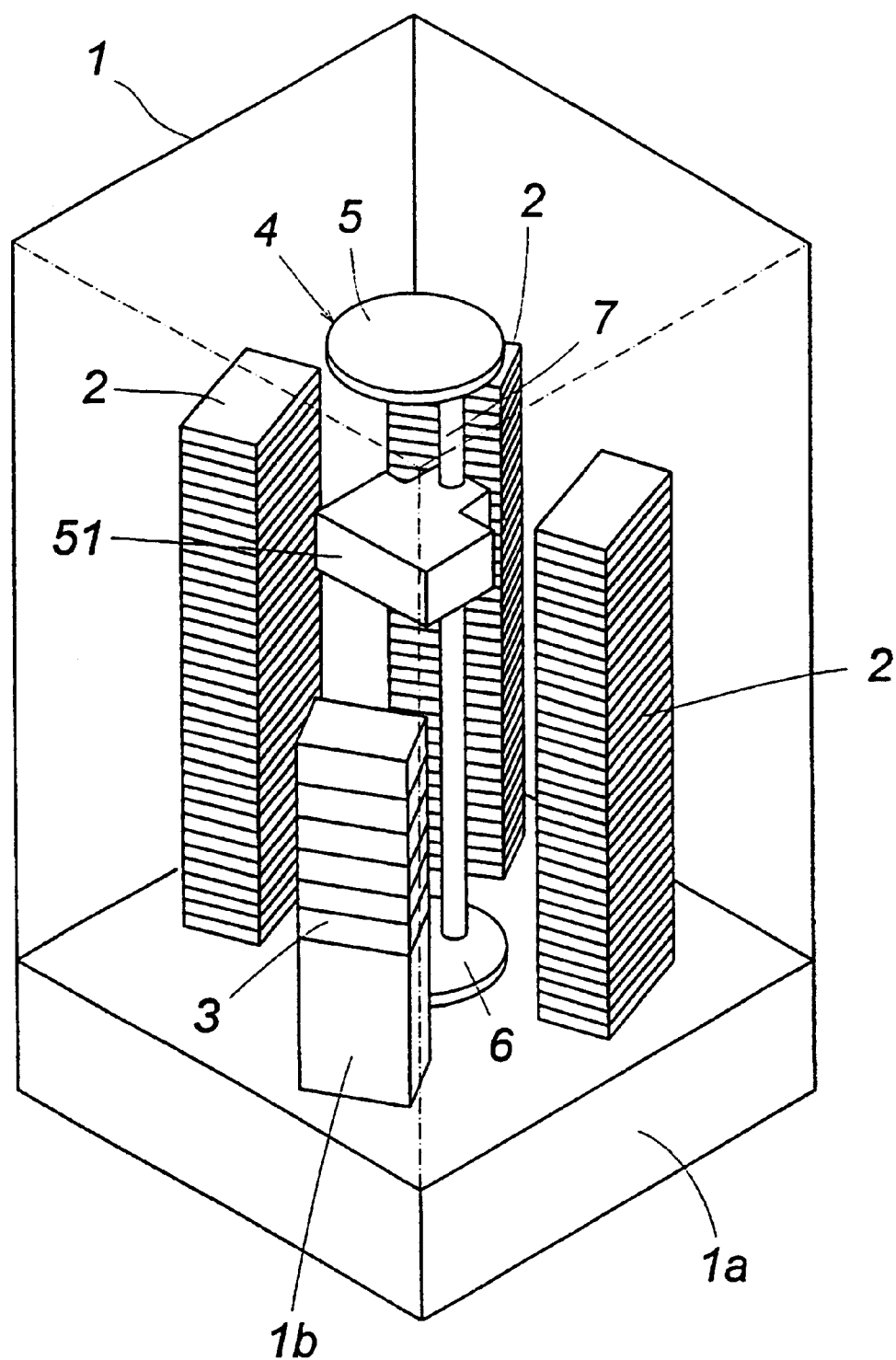
FIG. 12 is a perspective view of a second embodiment.
Figure 13:
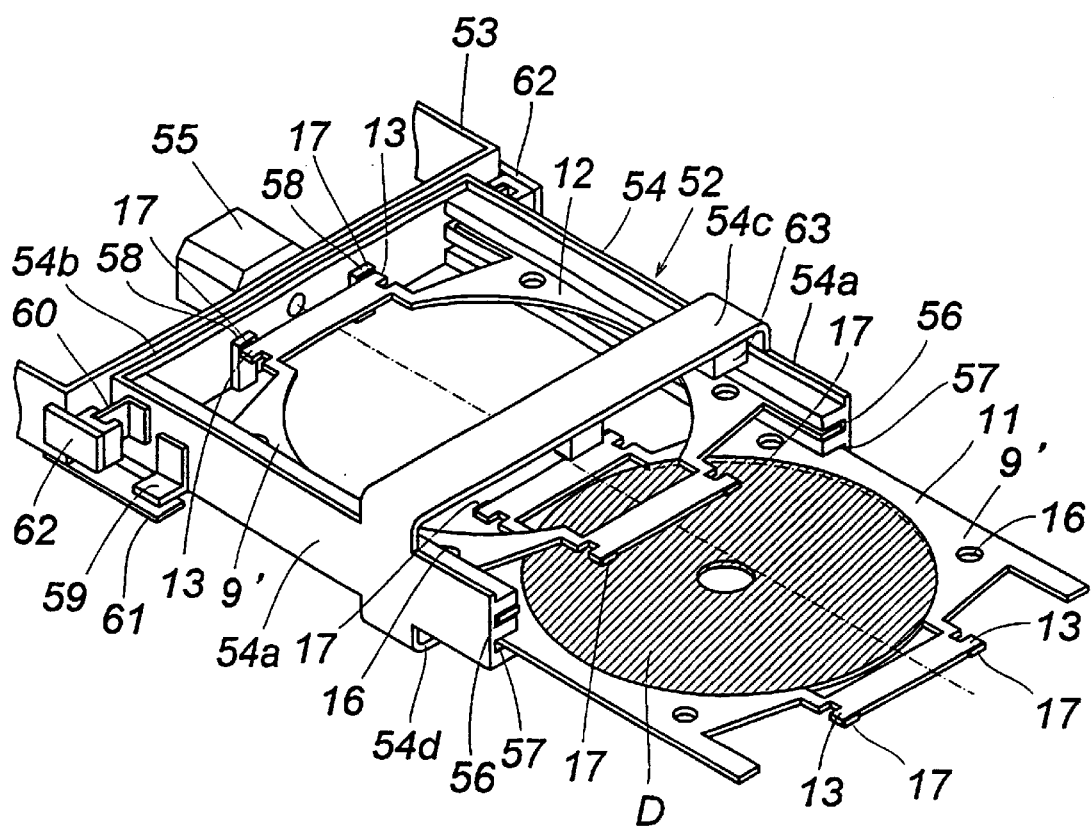
FIG. 13 is a perspective view of a turn-over mechanism.

FIG. 12 is a perspective view showing a second embodiment, in which a part of the housing 1 is shown by an imaginary line. On the post 7 is supported a hand-over mechanism 51 not having the turn-over faculty instead of the turn-over and hand-over mechanism 8 of the first embodiment, and within a housing 1b provided under the recording and reproducing drive 3, is arranged a turn-over mechanism 52 shown in a perspective view of FIG. 13. In a pallet 9', there are formed four holes 16, and two pairs of iron chips 17 are provided in the vicinity of the projections 13 of the pallet 9'. The hand-over mechanism 51 can merely hand-over the pallet 9' having the disc D placed thereon between the storing box 2, the recording and reproducing drive 3 and the turn-over mechanism 52, and the turn-over mechanism 52 can turn-over the disc D held between the two pallets 9'.

In the turn-over mechanism 52, a rotating frame 54 is supported rotatably by a bracket 53 secured to the housing 1b, and the rotating frame is rotated by means of a driving motor 55 secured to the bracket 53. In inner surfaces of side plates 54a of the rotating frame 54, there are formed two pairs of guide grooves 56 and 57 for guiding a pair of mutually opposing pallets 9'. Like as the first embodiment, a spacing between the guide grooves 56, 57 is set such that the disc D could not drop off between the opposing pallets 9'. On an inner surface of a rear plate 54b of the rotating frame 54, there are provided permanent magnets 58 which can attract the iron chips 17 of the pallets 9' with such a weak force that the pallets 9' could be drawn without difficulty.

On an outer surface of one of the side plates 54a of the rotating frame 54, there are provided a projection 59 acting with a stopper and a flag 60 for a sensor. To the bracket 53, there are provided a pair of stoppers 61 for restring the movement of the projection 59 of the rotating frame 54 and a pair of sensors 62 for detecting the flag 60. On an upper bridging portion 54c of the rotating frame 54, there is provided light emitting unit 63 of an optical sensor for detecting a position of the pallet 9' by means of the holes 16 of the pallet, and on a lower bridging portion 54d of the rotating frame 54 is provided a light receiving unit not shown which receives light from the light emitting unit 63. The empty pallet 9' has been previously inserted into the upper guide grooves 56 of the turn-over mechanism 52.

When it is required to transport the disc D within the hand-over mechanism 51 to the recording and reproducing drive 3 without being turned-over, the transporting mechanism 4 transports the hand-over mechanism 51 directly in front of the recording and reproducing drive 3, but when it is required to turn-over the disc D, the disc is once transported to the turn-over mechanism 52, and after turning-over the disc D in the turn-over mechanism 52, the disc D is transported into the recording and reproducing drive 3.

When the transporting mechanism 4 transports the hand-over mechanism 51 in front of the turn-over mechanism 52, the hand-over mechanism 51 pushes the pallet 9' having the disc D placed thereon into the lower guide grooves 57 of the turn-over mechanism 52. Then, the magnet 58 attracts the iron chip 17 of the pallet 9', and the light receiving unit of the optical sensor receives light emitted by the light emitting unit 63 through the holes 16 formed in the pallets 9' to detect a condition that the upper and lower pallets 9' are positioned at a correct position. After that, the rotating frame 54 is rotated in a right hand direction viewed in the inserting direction of the pallet 9' by means of the driving motor 55, and the rotation of the rotating frame 52 is stopped when the projection 59 is brought into contact with the other stopper 61, which is detected by the other sensor 62. The turn-over of the disc D is completed and the disc D is placed on the lower pallet 9'. Then, the hand-over mechanism 51 draws the pallet 9' having the turned-over disc D placed thereon from the turn-over mechanism 52, and the transporting mechanism 4 transports the hand-over mechanism 51 in front of the recording and reproducing drive 3.

Upon returning the disc D for which the recording or reproducing has been performed, into the original storing box 2, the turned-over disc D may be returned as it is and this fact is stored in the memory of the control circuit, or before returning the disc D, the disc may be transported into the turn-over mechanism 52 and may be turned-over.

In this manner, in the second embodiment, the hand-over mechanism 51 and turn-over mechanism 52 for turning-over the disc D are provided separately from each other instead of the turn-over and hand-over mechanism 8 of the first embodiment, and therefore the hand-over mechanism 51 and turn-over mechanism 52 can be simple in construction and can be easily controlled. It should be noted that a plurality of turn-over mechanisms 52 may be provided for shortening the transporting distance of the hand-over mechanism 51.

It the first and second embodiments, the disc D is exchanged between the storing box 2 and the recording and reproducing drive 3, but the invention may be applied to the transportation of the disc into the storing box and recording and reproducing drive 3. Furthermore, in the above embodiments, the storing boxes 2 and recording and reproducing drive 3 are provided on the same circle, but they may be arranged one on the other. The transporting mechanism 4 transports the pallets 9, 9' between the storing boxes 2, the recording and reproducing drive 3 and the turn-over mechanism 52 arranged on the same circle, but the pallets 9, 9' may be transported linearly between the storing boxes 2, the recording and reproducing drive 3 and the turn-over mechanism 52 which are aligned linearly.

Moreover, a plurality of automatic disc exchange apparatuses may be arranged in series, and mechanisms for handing-over the pallets 9, 9' having discs D placed thereon between these automatic disc exchange apparatuses. In this case, signals may be transmitted between these automatic disc exchange apparatuses as an infrared signal.

In the first and second embodiments, the pallets 9 are stacked such that a disc D could not drop off the pallets, but an intermediate plate having an opening through which a disc D passes may be arranged between the pallets 9. By providing such an intermediate plate, the disc D could not drop off the pallets, even if a spacing between the pallets is not so accurate. In this case, the intermediate plate has been previously arranged within the rotating frame 2 or the rotating frame 54.

Furthermore, the iron chip 17 and magnet 58 in the second embodiment may be also provided on the pallet 9 and up and down movable member 47 of the first embodiment. Moreover, magnets for attracting the iron chips 17 of the pallets 9, 9' may be provided within the storing boxes 2. Then, the pallets 9, 9' are retained in the storing boxes 2 with a weak force which could not affect the drawing of the pallets 9, 9'. Then, the pallets 9, 9' having the discs D placed thereon can be easily aligned within the storing box 2 and could not be easily moved due to vibration.

In the second embodiment, the optical sensor is used for detecting that the pallet 9' is at a given position, but this may be detected by mechanical sensor or other sensor.

Applicability on the Industry

In the disc turn-over mechanism according to the invention, the first pallet having a disc placed thereon and the second pallet having no disc placed thereon are stacked one on the other, and these first and second pallets are turned-over by the turning-over means such that the turned-over disc is placed on the second pallet. Therefore, the disc having the front and rear recording surfaces can be turned-over without being dropped off the pallets.

Since the automatic disc exchange apparatus according to the invention comprises the disc turn-over mechanism, the disc may be transported between the storing means and the recording and reproducing means, while the disc is turned-over if necessary.

What is claimed is:

1. A disc turn-over mechanism comprising at least two pairs of first and second pallets, and a turning-over means for turning-over said first and second pallets, wherein said first pallet on which a disc is placed and said second pallet on which no disc is placed are stacked one on the other, and said disc is transferred onto the second pallet by turning-over the first and second pallets by said turning-over means, the disc turn-over mechanism further comprising a rotating frame rotatably supported by a stationary portion and containing said first and second pallets, a first driving mechanism secured to said stationary portion and turning-over said rotating frame by 180 degrees from a substantially horizontal position to another substantially horizontal position, claw members for grasping said first and second pallets, and a second driving mechanism provided on said rotating frame and driving said claw members forward and backward.

2. A disc turn-over mechanism as claimed in claim 1, wherein said rotating frame includes guide grooves for guiding said first and second pallets horizontally in such a manner that the pallets are faced with each other.

3. A disc turn-over mechanism as claimed in claim 1, wherein said mechanism further comprises a means for supporting said pallets in given positions within said rotating frame by means of a magnetic force.

4. A disc turn-over mechanism as claimed in claim 1, wherein said mechanism further comprises a means for detecting a condition that said pallets are in given positions.

5. A disc turn-over mechanism as claimed in claim 1, wherein said mechanism further comprises a means for restricting the rotation of said rotating frame on a substantially horizontal posture.

6. A disc turn-over mechanism as claimed in claim 1, wherein said second pallet having no disc placed thereon has been previously provided within the rotating frame, and said first pallet having a disc placed thereon is stacked underneath the second pallet.

7. A disc-turn over mechanism as claimed in claim 1, further comprising a member for preventing said disc being dropped off through a space formed between said first and second pallets.

8. A disc turn-over mechanism comprising at least one pair of first and second pallets, and a turning-over means for turning-over said first and second pallets, wherein said first pallet on which a disc is placed and said second pallet on which no disc is placed are stacked one on the other, and said disc is transferred onto the second pallet by turning-over the first and second pallets by said turning-over means, the disc turn-over mechanism further comprising a rotating frame rotatably supported by a stationary portion and containing said first and second pallets, a first driving mechanism secured to said stationary portion and turning-over said rotating frame by 180 degrees from a substantially horizontal position to another substantially horizontal position, claw members for grasping said first and second pallets, and a second driving mechanism provided on said rotating frame and driving said claw members forward and backward, and said rotating frame including an up and down movable member on which said claw members are provided, and when said rotating frame is rotated, said up and down movable member is moved such that said claw members are moved from positions corresponding to said first pallet into positions corresponding to said second pallet.

9. A disc turn-over mechanism as claimed in claim 8, wherein said claw members are moved into the positions corresponding to said second pallet by means of the gravitational force.

10. A disc turn-over mechanism as claimed in claim 8, wherein said mechanism further comprises a means for moving forcedly said claw members into the positions corresponding to said second pallet.

11. A disc turn-over mechanism as claimed in claim 8, wherein said rotating frame includes a third driving mechanism for opening and closing said claw members.

12. A disc turn-over mechanism as claimed in claim 8, wherein said up and down movable member includes plural pairs of claw members, said pallet is separating or simultaneously pulled and drawn, and all said claw members are simultaneously moved into the positions corresponding to said second pallet.

13. An automatic disc exchange apparatus comprising a storing means for storing discs placed on pallets, a recording and reproducing means for recording and reproducing information on and from said discs, a transporting means for transporting said discs between said storing means and said recording and reproducing apparatus, and a turn-over mechanism for turning-over discs, wherein said turn-over mechanism includes at least two pairs of first and second pallets and a turning-over means for turning-over said first and second pallets which can place discs thereon, said first pallet on which a disc is placed and said second pallet on which no disc is placed are stacked one another, and said disc is transferred onto the second pallet by turning-over the first and second pallets by said turning-over means, said turn-over mechanism further comprising a rotating frame rotatably supported by a stationary portion of said transporting means and containing said first and second pallets, a first driving mechanism secured to said stationary portion and turning-over said rotating frame by 180 degrees from a substantially horizontal position to another substantially horizontal position, claw members for grasping said first and second pallets, and a second driving mechanism provided on said rotating frame driving said claw members forward and backward, whereby said disc can be turned-over during the transportation by said transporting means.

14. An automatic disc exchange apparatus as claimed in claim 13, wherein said storing means and said recording and reproducing means are arranged on a same circle such that their entrance and exit openings are faced inward with respect to said circle, said transporting means is provided within said circle, and said turn-over mechanism is arranged such that its entrance and exit opening is faced outward with respect to said circle.

15. An automatic disc exchange apparatus comprising a storing means for storing discs placed on pallets, a recording and reproducing means for recording and reproducing information on and from said discs, a transporting means for transporting said discs between said storing means and said recording and reproducing apparatus, and a turn-over mechanism for turning-over discs, wherein said turn-over mechanism includes at least one pair of first and second pallets and a turning-over means for turning-over said first and second pallets which can place discs thereon, said first pallet on which a disc is placed and said second pallet on which no disc is placed are stacked one another, and said disc is transferred onto the second pallet by turning-over the first and second pallets by said turning-over means, said turn-over mechanism further comprising a rotating frame rotatably supported by a stationary portion of said transporting means and containing said first and second pallets, a first driving mechanism secured to said stationary portion and turning-over said rotating frame by 180 degrees from a substantially horizontal position to another substantially horizontal position, claw members for grasping said first and second pallets, and a second driving mechanism provided on said rotating frame driving said claw members forward and backward, whereby said disc can be turned-over during the transportation by said transporting means, and said rotating frame including an up and down movable member on which said claw members are provided, and when said rotating frame is rotated, said up and down movable member is moved such that said claw members are moved from positions corresponding to said first pallet into positions corresponding to said second pallet.

16. An automatic disc exchange apparatus comprising a storing means for storing discs placed on pallets, a recording and reproducing means for recording and reproducing information on and from said discs, a transporting means for transporting said discs between said storing means and said recording and reproducing apparatus, and a turn-over mechanism for turning-over discs, wherein said turn-over mechanism includes at least one pair of first and second. pallets and a turning-over means for turning-over said first and second pallets which can place discs thereon, said first pallet on which a disc is placed and said second pallet on which no disc is placed are stacked one another, and said disc is transferred onto the second pallet by turning-over the first and second pallets by said turning-over means, characterized in that said storing means, said recording and reproducing means and said turn-over mechanism are arranged on a same circle such that their entrance and exit openings are faced inward with respect to said circle, and said transporting means is provided within said circle such that its entrance and exit opening is faced outward with respect to said circle.

17. An automatic disc exchange apparatus comprising a storing means for storing discs placed on pallets, a recording and reproducing means for recording and reproducing information on and from said discs, a transporting means for transporting said discs between said storing means and said recording and reproducing means, and a turn-over mechanism for turning-over discs, wherein said turn-over mechanism includes at least one pair of first and second pallets and a turning-over means for turning-over said first and second pallets which can place discs thereon, said first pallet on which a disc is placed and said second pallet on which no disc is placed are stacked one on another, and said disc is transferred onto the second pallet by turning-over the first and second pallets by said turning-over means, wherein said storing means, said recording and reproducing means and said turn-over mechanism are arranged linearly, and the entrance and exit openings of said storing means, said recording and reproducing means and said turn-over mechanism are faced toward the entrance and exit opening of said transporting means.

18. The automatic disc exchange apparatus of claim 17 further comprising two pairs of first and second pallets.

* * * * *